J. BUCKLEY.
SLED.
APPLICATION FILED JULY 21, 1911.

1,069,761.

Patented Aug. 12, 1913.

2 SHEETS—SHEET 1.

Witnesses

Inventor
J. Buckley
By
Attorneys.

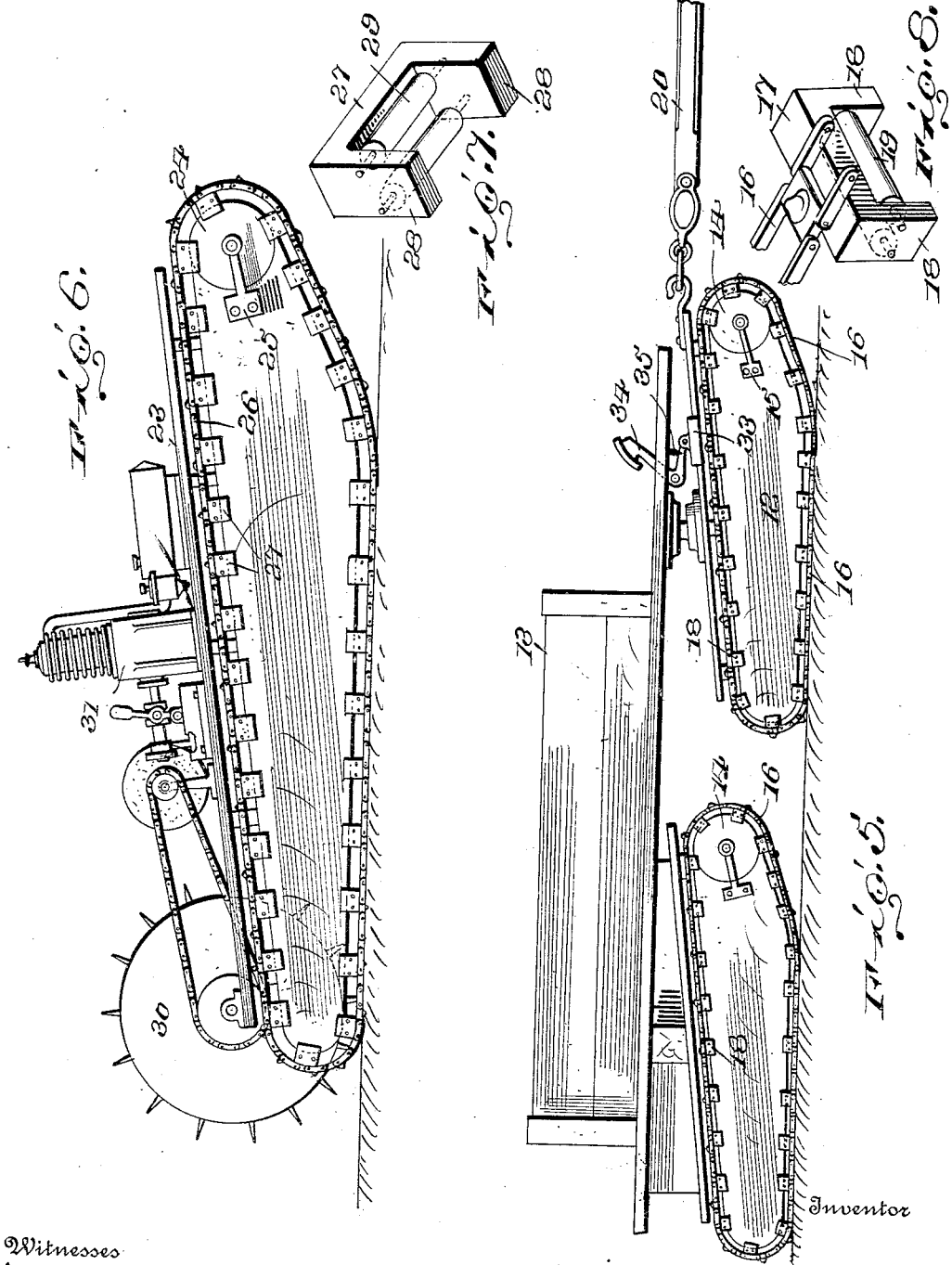

UNITED STATES PATENT OFFICE.

JOHN BUCKLEY, OF FRANKLIN, IDAHO, ASSIGNOR OF ONE-FOURTH TO ANDREW A. JOHNSON, ONE-FOURTH TO GEORGE A. KINGSFORD, AND ONE-FOURTH TO HENRY H. ALLEN, ALL OF FRANKLIN, IDAHO.

SLED.

1,069,761.  Specification of Letters Patent.  Patented Aug. 12, 1913.

Application filed July 21, 1911. Serial No. 639,817.

*To all whom it may concern:*

Be it known that I, JOHN BUCKLEY, citizen of the United States, residing at Franklin, in the county of Oneida and State of Idaho, have invented certain new and useful Improvements in Sleds, of which the following is a specification.

This invention relates to vehicles and particularly to sleds or sleighs.

The primary object of my invention is to provide a sled or sleigh capable of use over ordinary roads without the necessity of traveling over snow or ice, and particularly to provide a vehicle having parallel runners with parallel endless tracks, one for each runner and movable in a closed path with relation to the runners, the track being revoluble as the sled proceeds so that each track is laid down in front of the corresponding runner and is drawn up over the rear end of the corresponding runner as the sled proceeds on its way.

Another object of the invention is to perfect the details of the endless track and to provide means in connection therewith whereby the frictional resistance between the track and the sled runner may be reduced to a minimum.

Another object is to provide means for braking the forward movement of the vehicle and to provide for reducing the friction of the endless track with the wheel at its forward end where the greatest pressure between the runner and track would occur.

My invention is equally applicable to a hand sled, a sled or sleigh intended to be drawn by a team, or to a sled driven by a motor.

Figure 1:
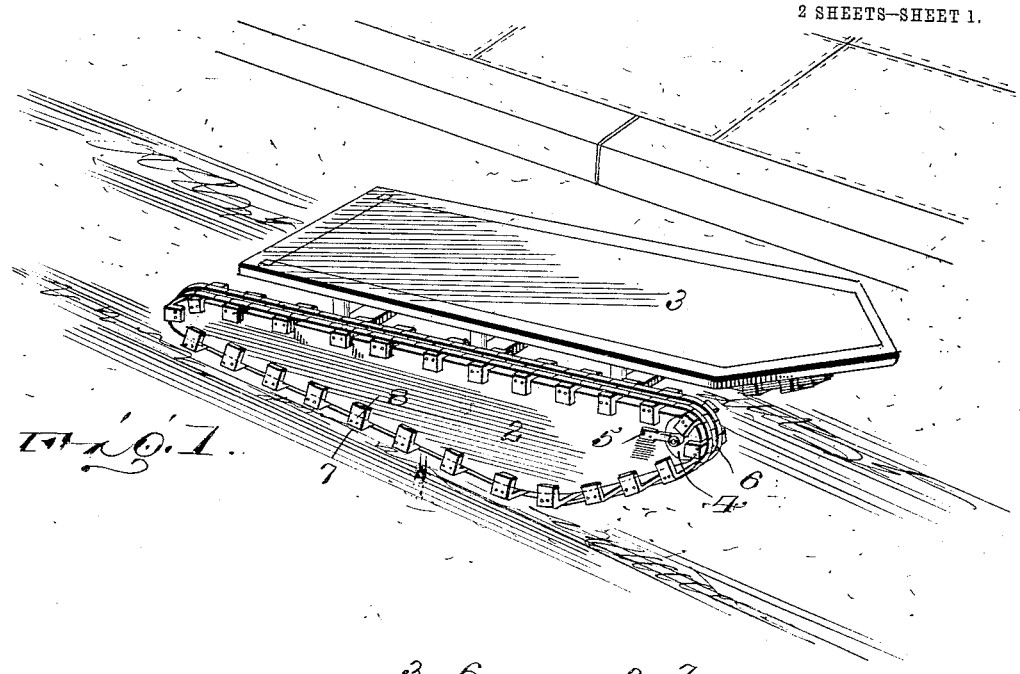
Figure 2:
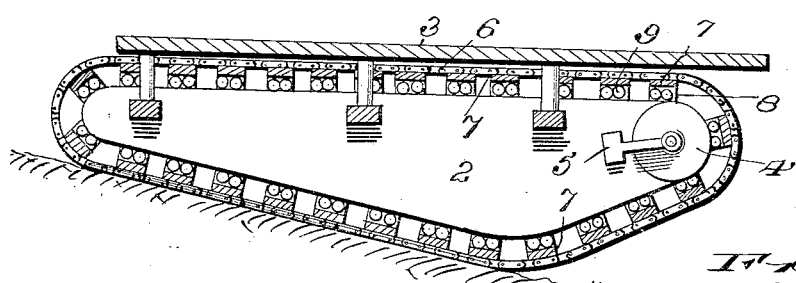
Figure 3:
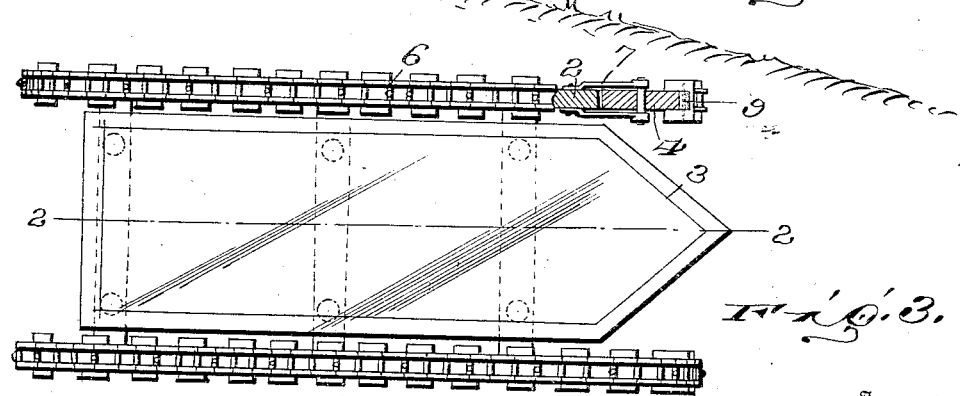
Figure 4:
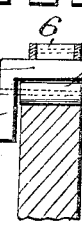

In the drawings: Figure 1 is a perspective view of a coasting annular sled constructed in accordance with my invention. Fig. 2 is a vertical section of the same on the line 2—2 of Fig. 3. Fig. 3 is a plan view of the sled, the forward end of one of the runners being broken away. Fig. 4 is a transverse section of the flexible traction member and the block attached thereto. Fig. 5 is a side elevation of a sleigh designed to be drawn by a team. Fig. 6 is a side elevation of a sled or sleigh designed to be operated under its own power. Fig. 7 is a perspective view of one of the blocks upon which the runners move. Fig. 8 is a perspective view of one of the blocks used in the form of my invention shown in Fig. 5 and a portion of the flexible member which connects the blocks.

Corresponding and like parts are referred to in the following description and indicated in all the views of the accompanying drawings by the same reference characters.

In Figs. 1 to 3 I have shown a hand sled, that is, a coasting sled provided with my invention, and in these figures, 2 designates parallel, oppositely disposed sled runners connected by cross bars supporting a sled platform 3. This platform may be of any suitable description and may support a seat if desired. Preferably each runner is in the form of an obtuse angle triangle, the hypotenuse of the triangle being upward and the ends rounded as illustrated in Fig. 2. The forward end of each runner carries upon it a roller 4 supported in any suitable manner as by brackets 5. If desired, the rear end of the runner might also be provided with such a roller. I do not wish to be limited to any particular shape for the runner, though I believe the shape shown in Fig. 2 to be the best, for the reason that the upwardly extending front end rides better over obstacles, and a better engagement is secured between the track blocks and the runner than is possible where the forward end of the runner extends downward at a more acute angle to the lower edge of the runner.

Traveling around the edges of each runner is a flexible band designated 6 which is preferably composed of a series of links. This band is entirely flexible, and supported upon the band at intervals along its length are a plurality of blocks 7, these blocks being U-shaped in cross section, that is, provided at their ends with inwardly extending flanges 8 as shown in Fig. 4, these flanges embracing the margin of the runner between them. The flanges on the blocks all extend inward, that is, toward the runner, and the blocks are of course disposed upon the inside face of the chain or flexible track member 6, so that the exterior face of the track member is relatively smooth. Preferably the exterior face of the track member 6 is formed with teeth, lugs, corrugations or projections which will engage the roadbed and secure a good traction between the member 6 and the roadbed. The roller 4 is of a width just sufficient to pass between the flanges 8 of the blocks so that the blocks can pass up over said roller 4 without being impeded thereby.

While I do not wish to be limited to the use of rollers disposed within the blocks 7, I preferably provide the blocks 7 each with a pair of rollers 9 mounted between the flanges 8 and located near the front and rear edges of the block.

In practical use, the improved sled is used precisely as any other sled is used, except that it travels over ordinary ground. Where it is to be used for coasting, the weight of the person upon the sled will tend to cause the sled to travel down hill. Inasmuch as the flexible endless track has a tractive engagement with the ground, the runners will be caused to move over the endless track so that the endless track will have a rotative movement relative to the runners and thus will be laid down in front of the runners and carried upward behind the runners as the sled moves downward, thus providing a continuous track for the runners. The rollers 9 if used reduce any friction between the track and the runners. I do not, however, wish to be limited to the rollers 9 as it might be possible to use other means for reducing friction between the lower edges of the runners and the track.

My invention is equally adapted to sleds which are to be drawn and in Fig. 5 I show such a sled. In this figure, 12 designates the runners which are connected to each other by cross bars in any suitable manner and which support a body 13 of any suitable character. Each of the runners has preferably the form illustrated. Each of the runners has a roller 14 supported on its forward end by means of the brackets 15, and traveling over the edges of the runners is the endless track 16 formed of a band preferably composed of links, this band supporting a plurality of blocks 17 which engage with the edges of the runner precisely as before described. Each of these blocks is provided with the side flanges 18 to embrace the margins of the runners, and each block is preferably provided with the oppositely disposed, parallel antifriction rollers 19. The sled is also provided with a tongue 20 whereby it may be drawn. The operation of this form of my invention is precisely the same as that previously described. The sled is preferably a bob-sled for the reason that the forward sled must be made relatively short in order to guide properly.

In Fig. 6 I show my invention as applied to a motor driven sled. In this form the sled runners 2 support a body 23 and the forward ends of the sled runners are provided with the rollers 24 supported on the brackets 25. Extending around each of the sled runners is an endless track or band 26 preferably composed of links and supporting a plurality of blocks 27, each having the end flanges 28 which embrace the margins of the runners. This form of my invention operates in precisely the same manner as heretofore described. The vehicle instead of being propelled by draft animals is propelled by any suitable means, as for instance by a spur wheel 30 mounted between the runners and engaging with the ground, this spur wheel being driven by a motor 31 mounted upon the body of the vehicle. The vehicle may be guided by impeding the progress of the vehicle on one side or the other, thus causing it to turn, or the vehicle may be in the form of a bob-sled and the forward runners may be turned so as to guide the vehicle in any desired track. This form of my invention it will be seen operates in precisely the same manner as heretofore described.

While I may use any suitable braking mechanism, I preferably provide for all forms of vehicle a brake which will engage with the endless track and impede its movement relative to the sled runner. In Fig. 5 I have shown such a brake comprising a shoe 33 mounted upon the body of the vehicle and movable downward into engagement with the upper flight of the endless track. The brake shoe may be shifted by means of a lever 34 or in any other suitable manner and is normally held out of engagement with the endless track by means of a spring 35.

While I have illustrated what I regard as the preferable details of my construction, I do not wish to be limited thereto as it is obvious that many changes might be made without departing from the spirit of the invention.

My invention is simple, easily applied, is capable of a large variety of uses and can be applied equally well either to children's sleds or to large sleighs.

What I claim is:

A supporting structure including side members spaced apart, endless flexible members extending around said side members, a plurality of blocks spaced apart and connected to said flexible members and each formed with inwardly directed lugs at the ends, and a plurality of rollers pivoted between the lugs of each of said blocks, said rollers being of less diameter than the depths of the lugs, whereby the rollers travel upon the outer edges of the side members and the lugs extend over the side faces of the same in advance of the ends of the rollers.

In testimony whereof, I affix my signature in presence of two witnesses.

JOHN BUCKLEY. [L. S.]

Witnesses:
H. H. ALLEN,
EZRA P. MONSON.